US012759837B2

(12) United States Patent
Kattainen et al.

(10) Patent No.: US 12,759,837 B2
(45) Date of Patent: Oct. 13, 2026

(54) ELEVATOR COMMUNICATION SYSTEM

(71) Applicant: Kone Corporation, Helsinki (FI)

(72) Inventors: Ari Kattainen, Helsinki (FI); Juha-Matti Aitamurto, Helsinki (FI); Gergely Huszak, Helsinki (FI)

(73) Assignee: Kone Corporation, Helsinki (FI)

(*) Notice: Subject to any disclaimer, the term of this patent is extended or adjusted under 35 U.S.C. 154(b) by 1583 days.

(21) Appl. No.: 17/230,380

(22) Filed: Apr. 14, 2021

(65) Prior Publication Data

US 2021/0339977 A1 Nov. 4, 2021

(30) Foreign Application Priority Data

Apr. 30, 2020 (EP) .................................... 20172439

(51) Int. Cl.
*B66B 1/34* (2006.01)
*B66B 5/00* (2006.01)

(52) U.S. Cl.
CPC .......... *B66B 1/3453* (2013.01); *B66B 1/3423* (2013.01); *B66B 1/3461* (2013.01); *B66B 5/0031* (2013.01)

(58) Field of Classification Search
CPC ... B66B 1/3453; B66B 1/3423; B66B 1/3461; B66B 5/0031
See application file for complete search history.

(56) References Cited

U.S. PATENT DOCUMENTS 5,654,985 A * 8/1997 Crayford ............. H04L 63/0236 370/246
10,214,383 B2 2/2019 Sonnenmoser et al.
(Continued)

FOREIGN PATENT DOCUMENTS

CN 102015503 B * 7/2013 ............... B66B 1/34
CN 103287936 A 9/2013
(Continued)

OTHER PUBLICATIONS

Extended European Search Report for European Patent Application No. 20172439.0 dated Oct. 22, 2020.
(Continued)

*Primary Examiner* — Eduardo Colon Santana
(74) *Attorney, Agent, or Firm* — Harness, Dickey & Pierce, P.L.C.

(57) ABSTRACT

An elevator communication system comprises an ethernet bus, a controller communicatively connected to the ethernet bus and configured to communicate via the ethernet bus; elevator system nodes communicatively connected to the ethernet bus and configured to communicate via the ethernet bus and each associated with a separate, respective landing; landing ethernet bus segments that are each at a separate landing and connected to a respective elevator system node that is associated with the separate landing; and a separate plurality of landing nodes at each separate landing and connected to a respective landing ethernet bus segment at the separate landing, Each elevator system node includes a connecting unit such that each elevator system node of is configured to enable communication between the ethernet bus and a separate, respective landing ethernet bus segment.

10 Claims, 3 Drawing Sheets

(56) References Cited

U.S. PATENT DOCUMENTS

| | | | | |
|---|---|---|---|---|
| 2004/0122738 | A1* | 6/2004 | Lum | G07G 1/12 705/21 |
| 2011/0302466 | A1 | 12/2011 | Ikawa et al. | |
| 2021/0058965 | A1* | 2/2021 | Chen | H04L 47/62 |
| 2022/0144584 | A1* | 5/2022 | Kemppainen | B66B 1/3415 |
| 2023/0027318 | A1* | 1/2023 | Kattainen | B66B 1/3453 |
| 2023/0373748 | A1* | 11/2023 | Kattainen | B66B 1/3423 |
| 2023/0373754 | A1* | 11/2023 | Kattainen | B66B 5/0012 |
| 2024/0182261 | A1* | 6/2024 | Kattainen | B66B 1/3476 |
| 2024/0228226 | A1* | 7/2024 | Jussila | B66B 1/3438 |

FOREIGN PATENT DOCUMENTS

| | | | |
|---|---|---|---|
| CN | 108473273 | A | 8/2018 |
| CN | 109626165 | A | 4/2019 |
| CN | 110831877 | A | 2/2020 |
| CN | 113581949 | A | 11/2021 |
| EP | 3015412 | A1 | 5/2016 |
| EP | 3187448 | A1 | 7/2017 |
| JP | 2003-112861 | A | 4/2003 |
| JP | 2003-201073 | A | 7/2003 |

OTHER PUBLICATIONS

Chinese Office Action dated Apr. 25, 2025 issued in corresponding Chinese Patent Appln. No. 202110452302.2.

* cited by examiner

ELEVATOR COMMUNICATION SYSTEM

RELATED APPLICATIONS

This application claims priority to European Patent Application No. 20172439.0 filed on Apr. 30, 2020, the entire contents of which are incorporated herein by reference.

TECHNICAL FIELD

The present application relates to the field of elevator communication systems.

BACKGROUND

In modern elevator system, more and more data is sent and received by different entities of an elevator system. For example, an elevator controller may receive information from call buttons and then control an elevator drive to serve calls, or the elevator controller may receive information from a safety circuit and then based on this information control one or more entities of the elevator system. These are only some possible examples of situations where information is received and/or sent within an elevator system.

It is characteristic for the modern elevator systems that an elevator system may comprise multiple different internal data transmission solutions. This may mean that multiple different communication stacks and multiple different physical layers may be used simultaneously. The use of multiple different internal data transmission solutions may result in a complicated and inefficient solution.

Thus, it would be beneficial to have a solution that would alleviate at least one of these drawbacks.

SUMMARY

According to a first aspect, there is provided an elevator communication system. The elevator communication system comprises an ethernet bus; a controller communicatively connected to the ethernet bus and being configured to communicate via the ethernet bus; a plurality of elevator system nodes communicatively connected to the ethernet bus and being configured to communicate via the ethernet bus, wherein each elevator system node is associated with a respective landing; a landing bus segment at each landing, the landing bus segment being connected to the elevator system node associated with the landing; and landings nodes at each landing connected to a respective landing bus segment. Each elevator system node of the plurality of elevator system nodes is provided with a connecting unit to enable communication between the ethernet bus and the respective landing bus segment.

In an implementation form of the first aspect, the landing bus segment comprises a multi-drop ethernet bus segment.

In an implementation form of the first aspect, the landing bus segment comprises a point to point ethernet bus segment.

In an implementation form of the first aspect, the point to point ethernet bus segment comprises a plurality of point to point ethernet bus segments linked together with at least one repeating element.

In an implementation form of the first aspect, the landing node comprises one of a display, a destination call panel, a car call button, a safety contact, a voice intercom system, and a camera.

According to a first aspect, there is a method for setting up an elevator communication system, the elevator communication system comprising an ethernet bus; a controller communicatively connected to the ethernet bus and being configured to communicate via the ethernet bus; a plurality of elevator system nodes communicatively connected to the ethernet bus and being configured to communicate via the ethernet bus, wherein each elevator system node is associated with a respective landing; a landing bus segment at each landing, the landing bus segment being connected to the elevator system node associated with the landing; landings nodes at each landing connected to a respective landing bus segment. Each elevator system node of the plurality of elevator system nodes is provided with a connecting unit to enable communication between the ethernet bus and the respective landing bus segment. The method comprises connecting a landing node to an elevator system node via a respective landing bus segment; communicating, by the elevator system node, identification data of the landing node to the controller; generating, by the controller, configuration data based on the identification data; transmitting, by the controller, the configuration data to the elevator system node; and transmitting, by the elevator system node, the configuration data to the landing node to set up the landing node.

In an implementation form of the second aspect, the landing bus segment comprises a multi-drop ethernet bus segment.

In an implementation form of the second aspect, the landing bus segment comprises a point to point ethernet bus segment.

In an implementation form of the second aspect, the point to point ethernet bus segment comprises a plurality of point to point ethernet bus segments linked together with at least one repeating element.

In an implementation form of the second aspect, the landing node comprises one of a display, a destination call panel, a car call button, a safety contact, a voice intercom system, and a camera.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates an ethernet bus based elevator communication system. In the illustrated solution each elevator system node associated with a landing and connected to the ethernet bus is provided with a connecting unit, for example, a switch to enable communication between the ethernet bus and a respective landing bus segment. The illustrated solution may enable, for example, a scalable system in which new landing bus nodes can be added easily and quickly to the elevator communication system, thus providing a simple and efficient solution.

In an example embodiment, the various embodiments discussed below may be used in an elevator system comprising an elevator that is suitable and may be used for transferring passengers between landing floors of a building in response to service requests. In another example embodiment, the various embodiments discussed below may be used in an elevator system comprising an elevator that is suitable and may be used for automated transferring of passengers between landings in response to service requests.

Figure 1A:
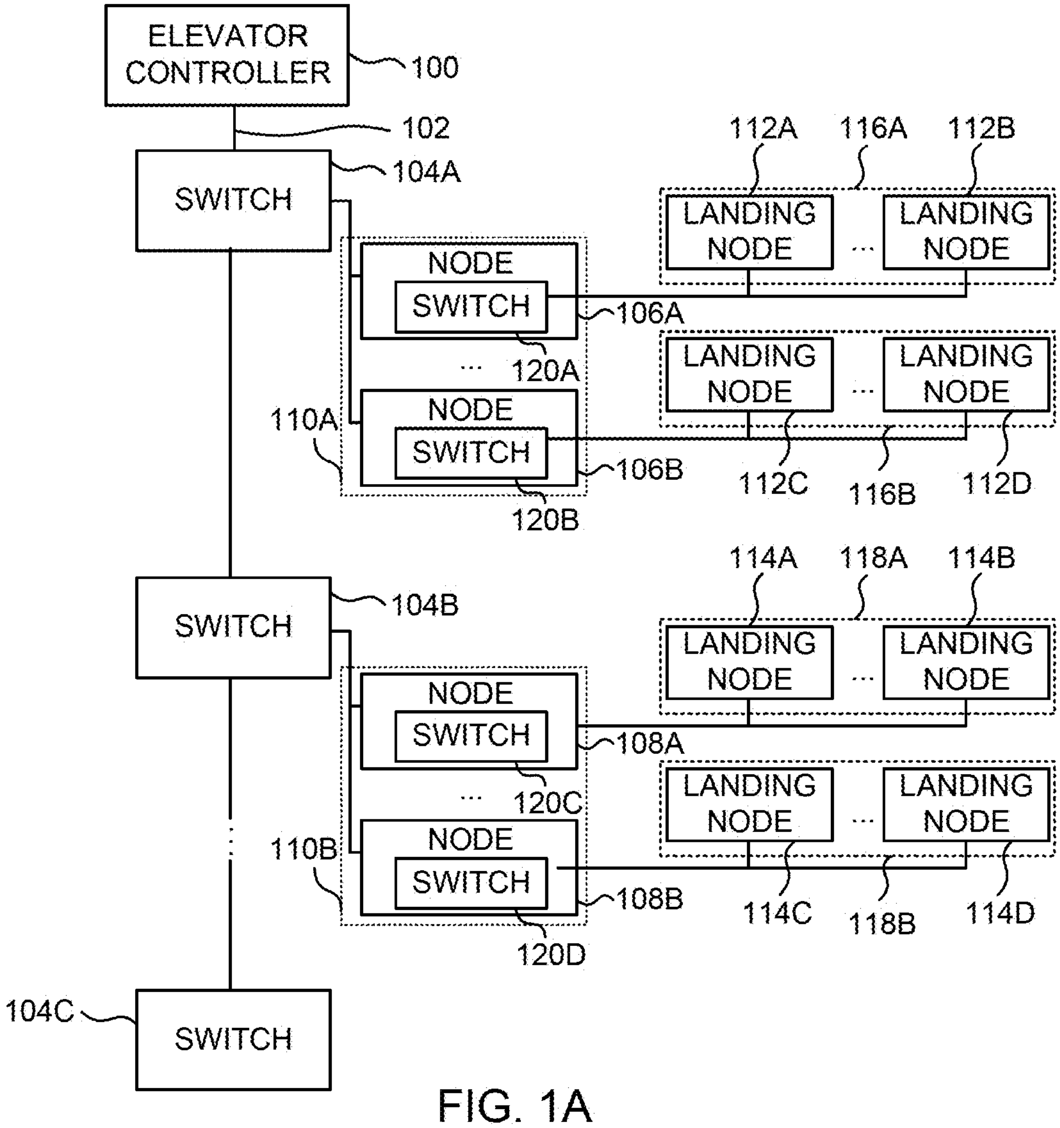
FIG. 1A illustrates an elevator communication system according to an example embodiment.

FIG. 1A illustrates an elevator communication system according to an example embodiment. The elevator communication system comprises an ethernet bus 102 and a controller 100, for example, an elevator controller, communicatively connected to the ethernet bus 102 and being configured to communicate via the ethernet bus 102. The system may further comprise a plurality of elevator system nodes 106A, 106B 108A, 108B communicatively connected to the ethernet bus 102 and being configured to communicate via the ethernet bus 102. Each elevator system node 106A, 106B, 108A, 108B is associated with a respective landing. i.e. a floor. The elevator communication system may comprise one or more communication units 104A, 104B, 104C, for example, switches, hubs or routers, that are used to implement the ethernet bus 102. The ethernet bus 102 may be a point-to-point ethernet bus, for example, 100BASE-TX or 10BASET1L point-to-point ethernet bus.

The elevator communication system may further comprise a landing bus segment 116A, 116B, 118A, 118B at each landing, the landing bus segment 116A, 116B, 118A, 118B being connected to the elevator system node 106A, 106B, 108A, 108B associated with the landing. The landing bus segment 116A, 116B, 118A, 118B may comprise, for example, a multi-drop ethernet bus segment. The multi-drop ethernet bus segment may comprise, for example, 10BASE-T1S multi-drop ethernet bus. One or more landing nodes 112A, 112B, 112C, 112D, 114A, 114B, 114C, 114D may be connected to each landing bus segment 116A, 116B, 118A, 118B. Each elevator system node 106A, 106B, 108A, 108B may be provided with a switch 120A, 120B, 120C, 120D to enable communication between the ethernet bus 102 and the respective landing bus segment 116A, 116B, 118A, 118B. The landing node 112A, 112B, 112C, 112D, 114A, 114B, 114C, 114D may comprise, for example, one of a display, a destination call panel, a car call button, a safety contact, a voice intercom system, and a camera.

Figure 1B:
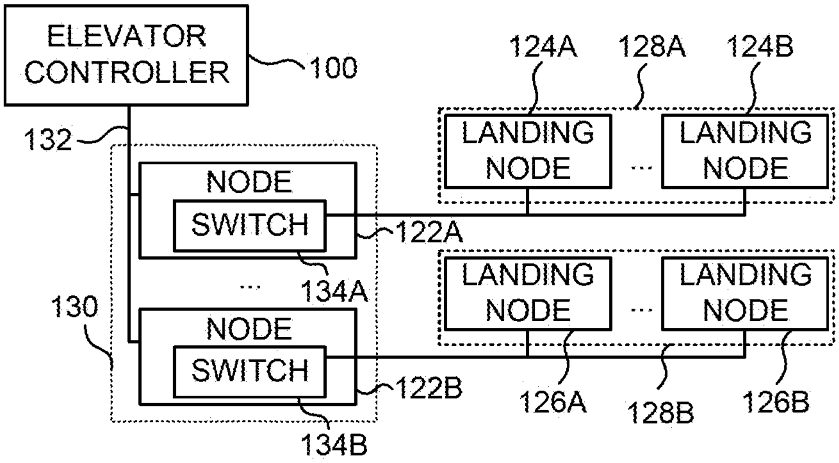
FIG. 1B illustrates an elevator communication system according to another example embodiment.

FIG. 1B illustrates an elevator communication system according to another example embodiment. The elevator communication system comprises an ethernet bus 132 and a controller 100, for example, an elevator controller, communicatively connected to the ethernet bus 132 and being configured to communicate via the ethernet bus 132. The ethernet bus 132 comprise, for example, 10BASE-T1S multi-drop ethernet bus. The system may further comprise a plurality of elevator system nodes 122A, 122B communicatively connected to the ethernet bus 132 and being configured to communicate via the ethernet bus 132. Each elevator system node 122A, 122B is associated with a respective landing. i.e. a floor. The elevator system nodes 122A, 122B may form a multi-drop ethernet bus segment 130 connected to the controller 100. The multi-drop ethernet bus segment 130 may comprise, for example, 10BASE-T1S multi-drop ethernet bus.

The elevator communication system may further comprise a landing bus segment 128A, 128B at each landing, the landing bus segment 128A, 128B being connected to the elevator system node 122A, 122B associated with the landing. The landing bus segment 128A, 128B may comprise, for example, a multi-drop ethernet bus segment. One or more landing nodes 124A, 124B, 126A, 126B may be connected to each landing bus segment 128A, 128B. Each elevator system node 122A, 122B may be provided with a connecting unit, for example, a switch 134A, 134B to enable communication between the ethernet bus 132 and the respective landing bus segment 128A, 128B. The landing node 124A, 124B, 126A, 126B may comprise, for example, one of a display, a destination call panel, a car call button, a safety contact, a voice intercom system, and a camera.

Figure 1C:
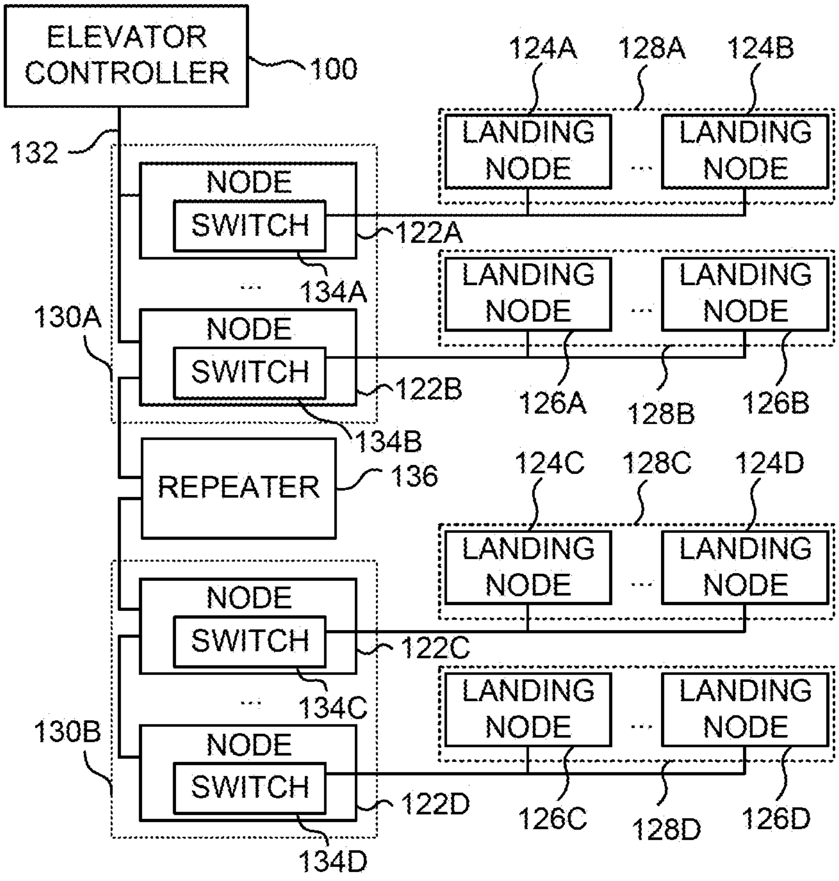
FIG. 1C illustrates an elevator communication system according to another example embodiment.

FIG. 1C illustrates an elevator communication system according to another example embodiment. The elevator communication system comprises an ethernet bus 132 and a controller 100, for example, an elevator controller, communicatively connected to the ethernet bus 132 and being configured to communicate via the ethernet bus 132. The ethernet bus 132 comprise, for example, 10BASE-T1S multi-drop ethernet bus. The system may further comprise a plurality of elevator system nodes 122A, 122B, 122C, 122D communicatively connected to the ethernet bus 132 and being configured to communicate via the ethernet bus 132. Each elevator system node 122A, 122B, 122C, 122D is associated with a respective landing. i.e. a floor. The elevator system nodes 122A, 122B may form a first multi-drop ethernet bus segment 130A and the elevator system nodes 122C, 122D may form a second multi-drop ethernet bus segment 130B. A repeating element 136, for example, a T1L-T1L hub, may be arranged between two elevator system nodes. The use of the repeating element 136 enables an easy and simply way to build an ethernet based communication system.

The elevator communication system may further comprise a landing bus segment 128A, 128B, 128C, 128D at each landing, the landing bus segment 128A, 128B, 128C, 128D being connected to the elevator system node 122A, 122B, 122C, 122D associated with the landing. The landing bus segment 128A, 128B, 128C, 128D may comprise, for example, a multi-drop ethernet bus segment. One or more landing nodes 124A, 124B, 124C, 124D, 126A, 126B, 126C, 126D may be connected to each landing bus segment 128A, 128B, 128C, 128D. Each elevator system node 122A, 122B, 122C, 122D may be provided with a connecting unit, for example, a switch 134A, 134B, 134C, 134D to enable communication between the ethernet bus 132 and the respective landing bus segment 128A, 128B, 128C, 128D. The landing node 124A, 124B, 124C, 124D, 126A, 126B, 126C, 126D may comprise, for example, one of a display, a destination call panel, a car call button, a safety contact, a voice intercom system, and a camera. The multi-drop ethernet bus segment 128A-128C may comprise, for example, 10BASE-T1S multi-drop ethernet bus.

Figure 1D:
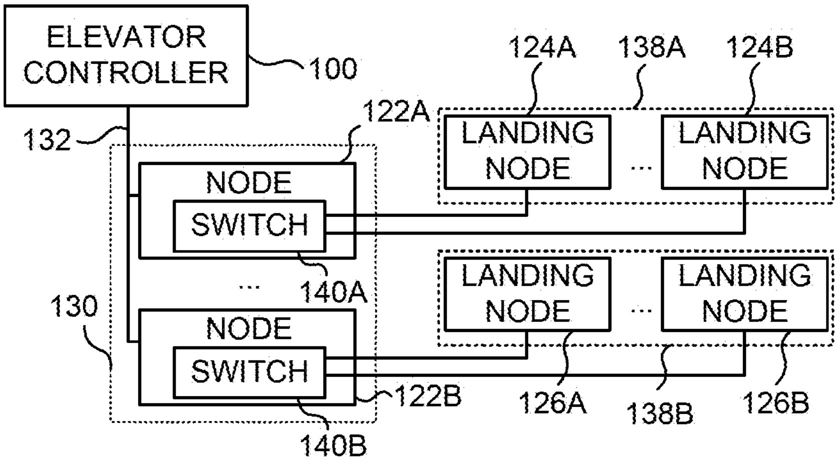
FIG. 1D illustrates an elevator communication system according to another example embodiment.

FIG. 1D illustrates an elevator communication system according to another example embodiment. The elevator communication system comprises an ethernet bus 132 and a controller 100, for example, an elevator controller, communicatively connected to the ethernet bus 132 and being configured to communicate via the ethernet bus 132. The ethernet bus 132 comprise, for example, 10BASE-T1S multi-drop ethernet bus. The system may further comprise a plurality of elevator system nodes 122A, 122B communicatively connected to the ethernet bus 132 and being configured to communicate via the ethernet bus 132. Each elevator system node 122A, 122B is associated with a respective landing. i.e. a floor. The elevator system nodes 122A, 122B may form a multi-drop ethernet bus segment 130 connected to the controller 100. Instead of using the multi-drop ethernet bus segment, the elevator system nodes may be configured to be connected to a point to point ether bus.

The elevator communication system may further comprise a landing bus segment 138A, 138B at each landing. One or more landing nodes 124A, 124B, 126A, 126B may be connected to each landing bus segment 138A, 138B. Each landing node 124A, 124B, 126A, 126B of the landing bus segments 138A, 138B may be separately connected to the respective elevator system node 122A, 122B associated with the landing. The landing bus segment 128A, 128B may comprise, for example, a multi-drop ethernet bus segment. Each elevator system node 122A, 122B may be provided with a connecting unit, for example, a switch 140A, 140B to enable communication between the ethernet bus 132 and the respective landing bus segment 138A, 138B. The landing node 124A, 124B, 126A, 126B may comprise, for example, one of a display, a destination call panel, a car call button, a safety contact, a voice intercom system, and a camera. The multi-drop ethernet bus segment 128A-128C may comprise, for example, 10BASE-T1S multi-drop ethernet bus.

Figure 2:
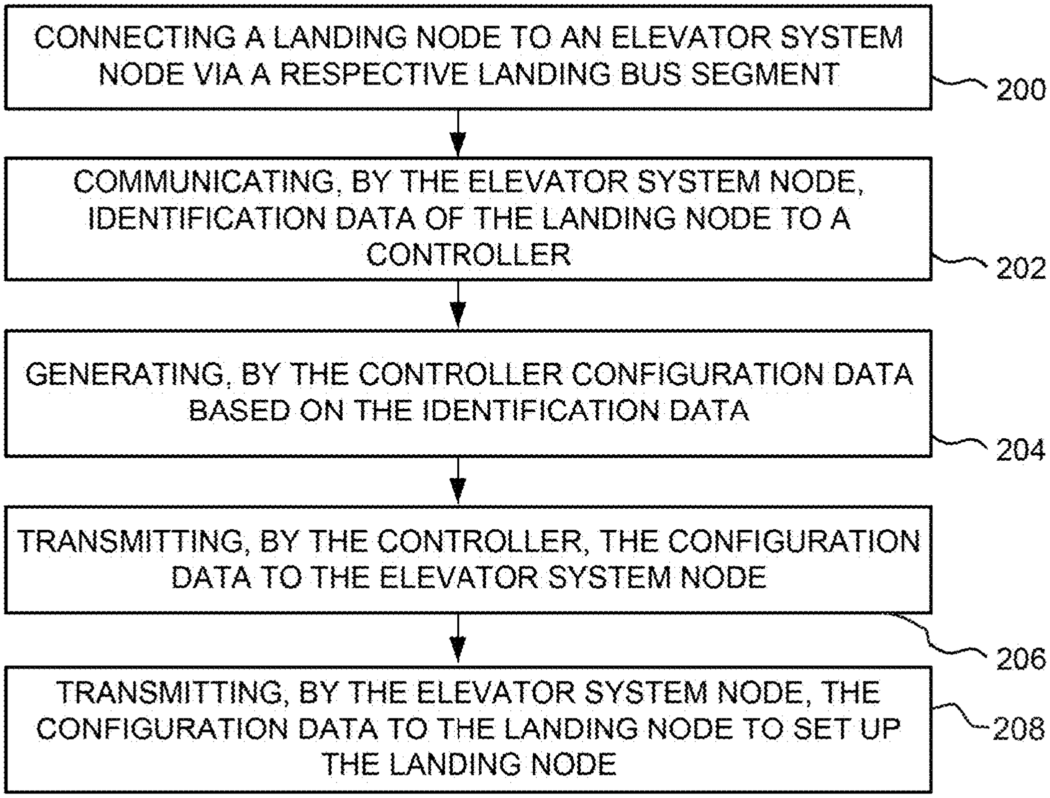
FIG. 2 illustrates a method for introducing a new elevator system component to an elevator control system comprising an ethernet bus according to an example embodiment.

FIG. 2 illustrates a method for setting up an elevator communication system. The elevator communication system comprises an ethernet bus, a controller communicatively connected to the ethernet bus and being configured to communicate via the ethernet bus, a plurality of elevator system nodes communicatively connected to the ethernet bus and being configured to communicate via the ethernet bus, wherein each elevator system node is associated with a respective landing, a landing bus segment at each landing, the landing bus segment being connected to the elevator system node associated with the landing, landings nodes at each landing connected to a respective landing bus segment, wherein each elevator system node of the plurality of elevator system nodes is provided with a connecting unit to enable communication between the ethernet bus and the respective landing bus segment. The physical implementation of the elevator communication system may be any of the ones illustrated in FIGS. 1A-1D.

At 200, a new landing node may be connected to an elevator system node via a respective landing bus segment. As illustrated in FIGS. 1A-1D, the landing bus may comprise a multi-drop ethernet bus or a point to point ethernet bus. The landing may comprise, for example, a display, a destination call panel, a car call button, a safety contact, a voice intercom system, and a camera.

At 202 identification data of the landing node is communicated by the elevator system node to a controller. The controller may comprise, for example, an elevator controller, a configuration controller, a cloud-based controller etc. In an example embodiment, operational characteristics and a physical address of the landing node or a component associated with the landing node may be communicated by the elevator system bus node to the controller. The landing node or the component may contain information of its features, characteristics and possibilities. This may be communicated to the controller via the elevator system node. Control tasks of the controller may be assigned based on the communicated information. Further, a physical location of the landing node/connected components may be solved. Further, when a message is sent from the landing node to the controller, switches and routers will automatically provide address information such that a network address of the sender will be known when message is received by a receiver.

At 204, configuration data is generated by the controller based on the identification data. The configuration data may be generated with the controller, for example, based on the operational characteristics and the physical address of the new elevator system component or landing node.

At 206 the configuration data is transmitted by the controller to the elevator system node.

At 208 the configuration data is transmitted by the elevator system node to the landing node to set up the landing node. After the configuration, the new landing node is able to communicate with the controller using the ethernet protocol. The illustrated solution may enable a solution in which, when a new elevator system component or a landing node is added to the system, it can be configured easily and in a very scalable way.

Figure 3A:
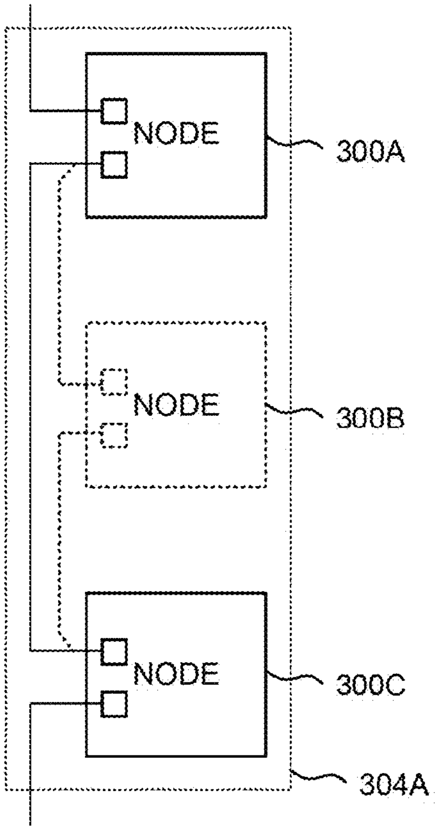
FIGS. 3A and 3B illustrate examples of adding a new elevator system component to an elevator control system according to an example embodiment.
Figure 3B:
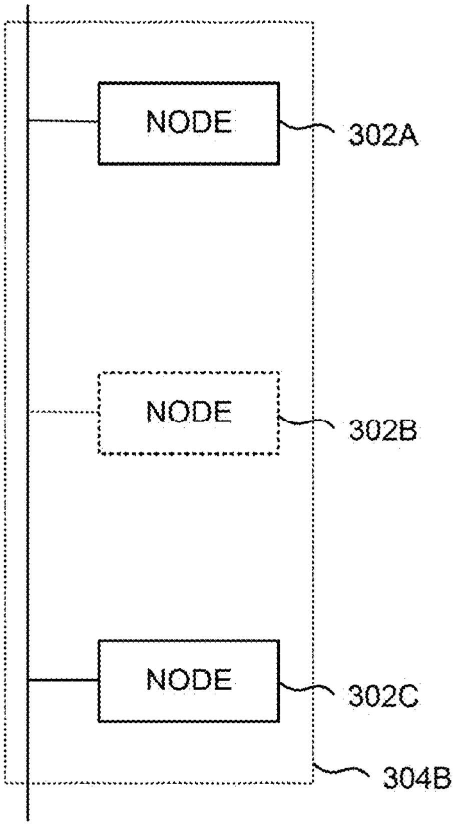

FIGS. 3A and 3B illustrate examples of adding a new elevator system component or a node to an elevator control system according to an example embodiment. FIG. 3A illustrates an example in which a new elevator system component, for example, a display, a destination call panel, a car call button, a safety contact, a voice intercom system, and a camera, is connected to a landing bus segment 304A via a new landing node 300B. In the simplified example, two landing nodes 300A, 300C were already connected to the landing bus segment 304A. In this example, the physical connection between the landing node is a two-connector solution such that a first connector of a node is connected to a previous landing node and a second connector of the landing node is connected to a subsequent landing node. The addition of the new landing node 300B is easy and can be made by placing the new landing node 300B between two existing landing nodes 300A, 300C and adjusting the wiring.

FIG. 3B illustrates an example in which a new elevator system component, for example, a display, a destination call panel, a car call button, a safety contact, a voice intercom system, and a camera, is connected to a landing bus segment 304B via a new landing node 302B. The landing bus segment 304B is implemented so that it enables an addition of a new landing node 302B without changing wiring of the already existing landing nodes 302A, 302C.

At least some of the above discussed example embodiments may enable transmission of any device data seamlessly between elevator system devices and any other device or system. Further, a common protocol stack may be used for all communication. At least some of the above discussed example embodiments may also enable a solution that provides high security and/or is easily expandable.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator communication system for an elevator, the elevator including a plurality of landings, the elevator communication system comprising:

an ethernet bus;

a controller communicatively connected to the ethernet bus, the controller configured to communicate via the ethernet bus;

a plurality of elevator system nodes communicatively connected to the ethernet bus, the plurality of elevator system nodes configured to communicate via the ethernet bus, wherein each elevator system node of the plurality of elevator system nodes is associated with a separate, respective landing of the plurality of landings;

a plurality of landing ethernet bus segments, each separate landing ethernet bus segment of the plurality of landing ethernet bus segments at a separate landing of the plurality of landings and connected to a respective elevator system node of the plurality of elevator system nodes that is associated with the separate landing; and a separate plurality of landing nodes at each separate landing of the plurality of landings, the separate plurality of landing nodes connected to a respective landing ethernet bus segment of the plurality of landing ethernet bus segments at the separate landing, wherein each elevator system node of the plurality of elevator system nodes includes a connecting unit such that each elevator system node of the plurality of elevator system nodes is configured to enable communication between the ethernet bus and a separate, respective landing ethernet bus segment of the plurality of landing ethernet bus segments.

2. The elevator communication system of claim 1, wherein each landing ethernet bus segment of the plurality of landing ethernet bus segments comprises a multi-drop ethernet bus segment.

3. The elevator communication system of claim 1, wherein each landing ethernet bus segment of the plurality of landing ethernet bus segments comprises a point to point ethernet bus segment.

4. The elevator communication system of claim 3, wherein the point to point ethernet bus segment comprises a plurality of point to point ethernet bus segments linked together with at least one repeating element.

5. The elevator communication system of claim 1, wherein each landing node of the separate plurality of landing nodes comprises one of a display, a destination call panel, a car call button, a safety contact, a voice intercom system, and a camera.

6. A method for setting up an elevator communication system for an elevator, the elevator including a plurality of landings, the elevator communication system including an ethernet bus, a controller communicatively connected to the ethernet bus, a plurality of elevator system nodes communicatively connected to the ethernet bus, a plurality of landing ethernet bus segments, and a separate plurality of landing nodes at each separate landing of the plurality of landings, the controller configured to communicate via the ethernet bus, the plurality of elevator system nodes configured to communicate via the ethernet bus each elevator system node of the plurality of elevator system nodes is associated with a separate, respective landing of the plurality of landings, each separate landing ethernet bus segment of the plurality of landing ethernet bus segments at a separate landing of the plurality of landings and connected to a respective elevator system node of the plurality of elevator system nodes that is associated with the separate landing, each separate plurality of landing nodes connected to a respective landing ethernet bus segment of the plurality of landing ethernet bus segments at the separate landing, each elevator system node of the plurality of elevator system nodes including a connecting unit such that each elevator system node of the plurality of elevator system nodes is configured to enable communication between the ethernet bus and a separate, respective landing ethernet bus segment of the plurality of landing ethernet bus segments, the method comprising:

connecting a first landing node to a first elevator system node of the plurality of elevator system nodes via a first landing ethernet bus segment of the plurality of landing ethernet bus segments;

communicating, by the first elevator system node, identification data of the first landing node to the controller via the ethernet bus; and transmitting configuration data from the controller to the first landing node via the ethernet bus, the first elevator system node, and the first landing ethernet bus segment to configure the first landing node to communicate with the controller using an ethernet protocol, based on the identification data being communicated to the controller.

7. The method of claim 6, wherein each landing ethernet bus segment of the plurality of landing ethernet bus segments comprises a multi-drop ethernet bus segment.

8. The method of claim 6, wherein each landing ethernet bus segment of the plurality of landing ethernet bus segments comprises a point to point ethernet bus segment.

9. The method of claim 8, wherein the point to point ethernet bus segment comprises a plurality of point to point ethernet bus segments linked together with at least one repeating element.

10. The method of claim 6, wherein each landing node of the separate plurality of landing nodes comprises one of a display, a destination call panel, a car call button, a safety contact, a voice intercom system, and a camera.

* * * * *